Oct. 5, 1965  H. A. JEWETT  3,209,639
KEYBOARDS AND ACTIONS
Filed Nov. 19, 1962  4 Sheets-Sheet 1

INVENTOR.
Harold A. Jewett.

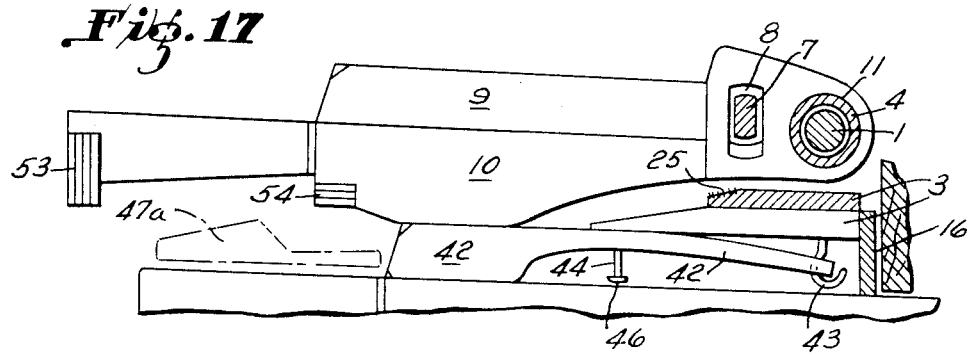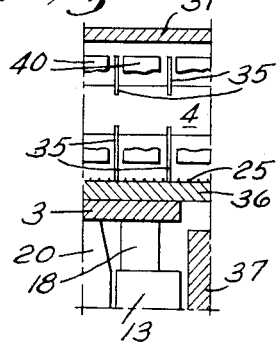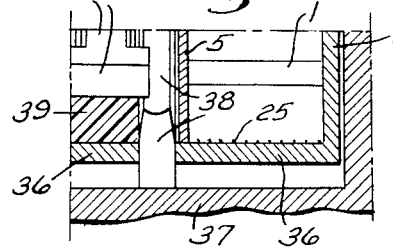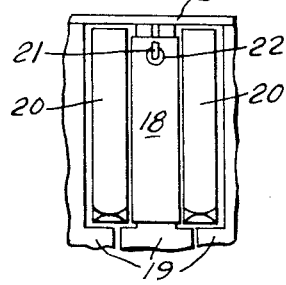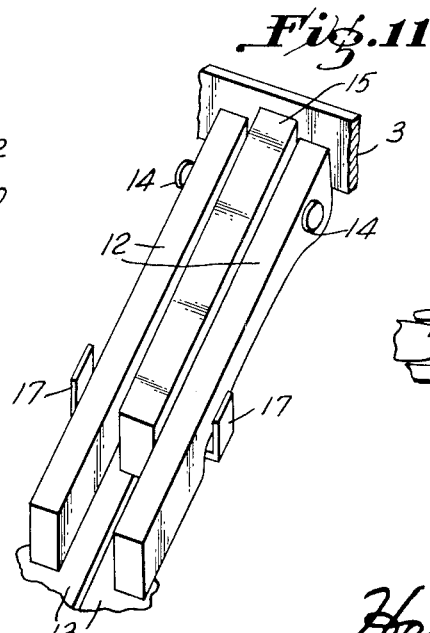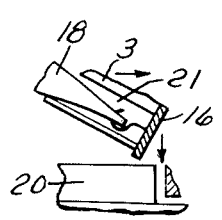

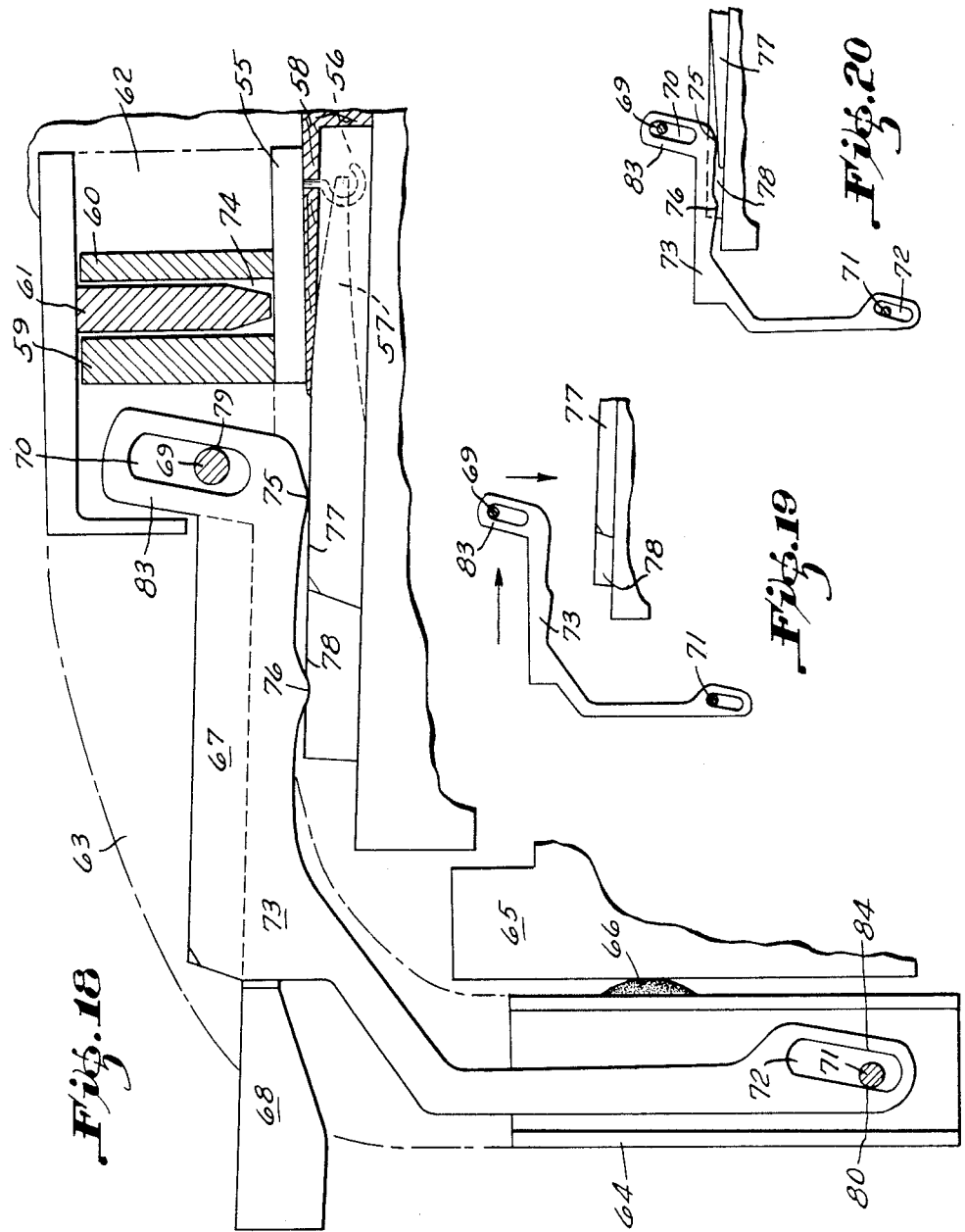

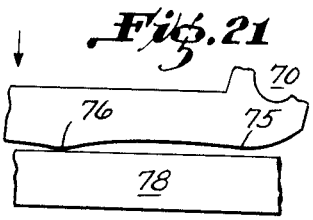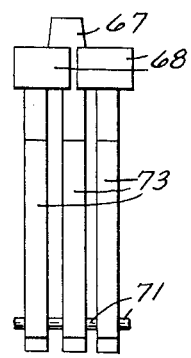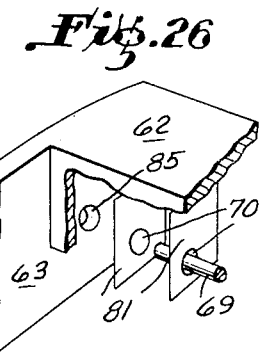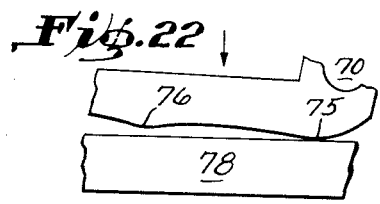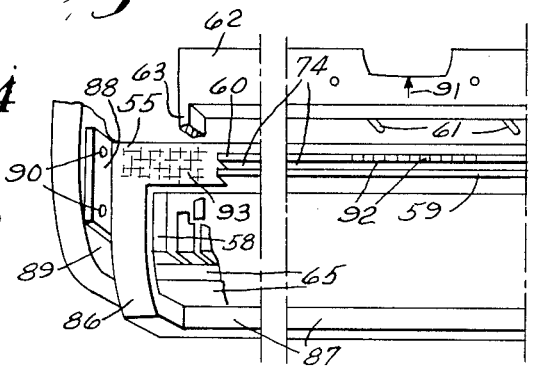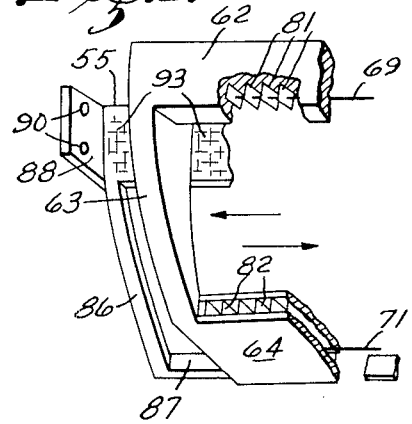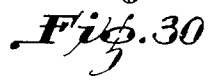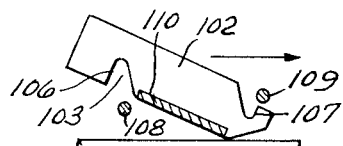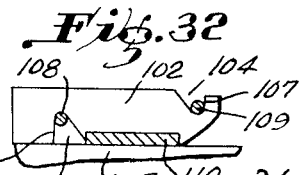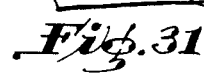
INVENTOR.
Harold A. Jewett.

United States Patent Office 3,209,639
Patented Oct. 5, 1965

3,209,639
KEYBOARDS AND ACTIONS
Harold A. Jewett, 5451 42nd St. NW., Washington, D.C.
Filed Nov. 19, 1962, Ser. No. 238,339
33 Claims. (Cl. 84—446)

This application contains subject matter which was disclosed to some extent in applicant's applications S.N. 138,424, filed Jan. 13, 1950; S.N. 307,099, filed Aug. 29, 1952; S.N. 116,364, filed June 5, 1961, and the applications on which his U.S. Patents 2,675,728 and 2,675,729 (now Reissue No. 23,956) and 2,996,942 issued; said S.N. 138,424 and 307,099, though now abandoned, having copended with the applications on which his said patents issued.

Said parent patents may be referred to below as '728, '956 and '942; and said parent applications as '424, '099, and '364. All of said patents as issued and said applications as amended are hereby incorporated-by-reference herein, insofar as not inconsistent with the disclosure of this application.

A number of abbreviations and terms used herein and/or the aforesaid parent applications will have the following meanings:

$tr$—transposing device or keyboard;

$\frac{1}{7}$ octave length; $\frac{oct}{7}$.

$\frac{oct}{12}$ $\frac{1}{12}$ octave length and/or a semitone, depending on the context;

Ivory or ivory cap or top—the upwardly facing finger-contacting surface of a key, whether or not supplied by a lamina;

Equalizer—means for imparting an approximately rectilinear quality to the motion of the ivory of a piano or organ type of key during use;

Levelizer—means for in effect raising the level of the tops of white ivories to that of the tops of adjacent black ivories;

Carrier key—any one of a succession of keys whose upper portions are generally alike and which are, or are provided with, their own equalizer means, and are adapted to carry and impart their equalization to ivory-capped passenger keys riding on them;

Passenger key—any one of a succession of keys which are generally alike (except that some are capped with white ivories and others with black) and are adapted to ride on carrier keys as aforesaid.

A central object of this application is the provision of a portable transposing device for placement over the manual of a keyboard type musical instrument, which device shall comprise a first frame that is stationary during use and a second frame that is shiftable along said first frame to a selected transpositional position in relation thereto; said second frame carrying a manual of piano type keys (below referred to as $tr$ keys) and said device being provided with means whereby uniformity of the extent of down movement of the fronts of the $tr$ white ivories during use is achieved, irrespective of whether they or any of them are resting on host black ivories or on levelizers, when depressed in use; also whereby said down movement may be restricted to not over $\frac{5}{8}"$, better not over $\frac{9}{16}"$ or $\frac{1}{2}"$, or still better to not over $\frac{7}{16}"$ or $\frac{3}{8}"$.

Accomplishment of said central object is effected by providing anchor means for rearward portions of said $tr$ keys, said means being disposed above rearward portions of the ivories of the manual of said instrument, plus $tr$ key motion-controlling means disposed to engage lower portions of the $tr$ keys (or at least the white ones) to limit or guide their down movement during use, said motion-controlling means being motionless during use and located frontwardly of the black ivories of said instrument.

Other objects of the invention include the provision of a $tr$ assembly such as aforesaid which may be operatively associated with a host piano or organ merely by setting it down on the manual and/or end blocks thereof, without need for any change in said host unless, in certain embodiments, to add small and scarcely visible anchor structures to the end cheeks of said instrument; also the provision of means permitting endwardly located $tr$ keys (e.g. where there are more, e.g. up to 4, 6, 8 or more, $tr$ keys than host keys) which are temporarily idle when the assembly is adjusted for transposition a particular number of semitones, to rest on host end blocks or structures thereon, without interfering with playing of the active $tr$ keys (i.e. those directly and operatively overlying the host keys).

Said other objects are accomplished by extending said anchor means into overlying position above end block structure or inactive host ivories of said instrument, so that terminal $tr$ keys anchored by said anchor means may rest on such structure when idle.

Still further objects include the provision of novel means or novel combinations of means in accordance with the following outline of objects which was set out in the original text of pages 2–3 of S.N. 585,010, on which '942 issued.

I.—In regard to portable assemblies of chromatic scale tone actuators generally:
 (a) For installation merely by setting the assembly down on or over a host manual, and de-installation merely by lifting the assembly away from such manual;
 (b) For centering and securing against endward displacement notwithstanding octave length variances among different makes or models of host instruments on which to be used; as well as for operability of all parts despite such variances;
 (c) For stabilizing against frontward or upward displacement without resort to fastening structures;
 (d) For insuring constancy of shape and dimension (despite atmospheric variations and lapse of time), corrosion resistance, lightness of weight, ruggedness, and general durability.

II.—In regard to portable $tr$'s particularly (besides objects I–$a$ to $d$ above):
 (a) For shifting a bench of $tr$ keys to a desired transpositional position by a single, approximately instantaneous manipulation;
 (b) For minimizing the distance of the $tr$ manual above the host manual;
 (c) For minimizing arcing of the $tr$ keys and levelizers associated with them, as well as the drop of the $tr$ white key fronts;
 (d) For minimizing rub and wear of key action and guide parts;
 (e) For eliminating need for $tr$ key return springs.

III.—In regard to in-built $tr$'s (besides objects I–$d$ and II–$a$, $d$ and $c$):
 (a) For minimizing outwardly visible differences from non-$tr$ keyboard instruments;
 (b) For minimizing front-to-rear overall dimension;
 (c) For imparting improved ivory motion to the $tr$ keys.

Accomplishments of the objects particularized in the foregoing outline of objects is effected by the novel means disclosed in '942 and '364 and/or the novel improvements in respect thereto exemplified in FIGS. 1–32 hereof.

Further objects include novel forms of levelizers, alinement-preserving means for them, novel *tr* keys-lifter bars and associated parts, novel lifter keys, and novel stabilizing and alinement-preserving means for *tr* keys. Accomplishment of said further objects likewise is effected by the novel means disclosed in '942 and '364 and/or the aforesaid novel improvements in respect thereto exemplified in said FIGS. 1–32.

Additional objects include the provision of novel means for imparting straight-line motion to piano type keys, particularly the *tr* keys of a portable *tr* assembly adapted for use on a host piano, said means comprising novel motion-controlling means such as above referred to and including anchor means at the rear of a resiliently supported key, downwardly (or upwardly, in certain embodiments) extending plunger-type equalizer structure integral with said key and forming a rigid elbow therewith, motionless-in-use structure spaced downwardly (or upwardly, in said certain embodiments) from said elbow, and a resiliently yieldable support for said key, which support may be a host key in the case of a transposing device of the invention. In the latter case the ratio of the distance of the horizontal plane which includes the or a point of intercontact between said resilient support and the *tr* key resting on it, above the or a point of intercontact between said equalizer structure and said motionless-in-use structure, to the overall (horizontal) distance between said points of intercontact, advantageously will be at least ½, ¾, ¼, ⅝, ⅞ or more.

Additional objects and their accomplishment will appear as the description of the invention proceeds.

In the drawings (in respect to which chromatic scale tone producer installations, if not shown, are to be understood as implied; moving and bearing parts as being optionally provided with rollers, rockers or the like, and/or "anti-stick" or slippery-but-wear-resistant surfacing at bearing or rub points, also as being subject to modification to give them or enhance their individual replaceability; lever, spring or other moving parts as provided, when needed, with suitable freedom of play and appropriate stop, anti-backlash, damper and/or sound-absorbing means; all parts as having fitting anchorages or housings; all figures as being basically diagrammatic or schematic; and all expressions such as vertical, horizontal, downward, upward, front, rear, lateral, parallel, longitudinal, etc., as being relative and approximate unless otherwise evident), to be more particularly described later on:

FIG. 9 is a schematic elevation detail, partly in section and with certain parts omitted, of rear portions of a succession of said *tr* keys spaced by spacers such as that of FIG. 8;

FIG. 10 is a schematic front perspective detail of an idle treble-end white *tr* key resting on exaggeratedly elevated host treble end-supported-structure, analagously to the idle *tr* key of FIG. 6, plus an idle *tr* black key resting directly on adjacent host end block structure;

FIG. 11 is a perspective detail showing a partition resting on each of a pair of host white ivories and serving not only to thereby derive support for the *tr* assembly from them but also to carry pivot pins and alinement-preserving walls for each of a pair of levelizers such as those appearing in FIG. 1.

FIG. 12 is a plan detail showing a single levelizer provided with pivot means alternative to the pivot pins of FIG. 11, plus adjacent host black keys providing alinement-preserving walls for said levelizer;

FIG. 13 is a side elevation detail of the rear portion of the levelizer and pivot means of FIG. 12 plus adjacent *tr* structures, in process of being installed into position of use on a host keyboard;

FIG. 14 is the same as FIG. 13 except that installation of the parts depicted in that figure has been completed;

FIG. 15 is an exploded perspective detail of the rear portion of a form of levelizer alternative to that of FIG. 1, together with pivot and alinement-preserving means alternative to those of FIGS. 11–14;

FIG. 16 is a side elevation detail of the levelizer and pivot means of FIG. 15 plus adjacent *tr* structures, in process of being installed into position of use on a host keyboard;

FIG. 17 is similar to FIG. 1 except that the levelizer, pivot and alinement-preserving means appearing in FIG. 17 are those of FIGS. 15–16, and certain below-discussed variations have been introduced;

FIG. 18 is generally similar to FIG. 17 except that the fronts of the ivories of the *tr* keys appearing in FIG. 18 do not undergo arcuate movement during use, as do those of FIGS. 1 and 17, but rather are provided with novel means for imparting a straight-line quality to their movement during use;

Figure 1:
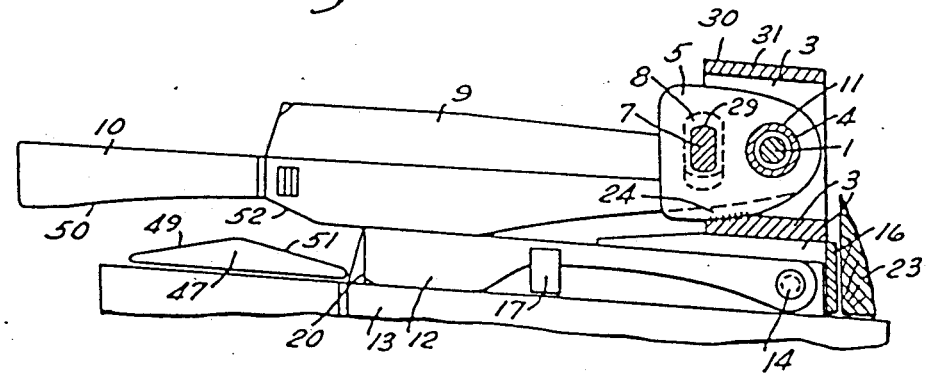
FIG. 1 is an end elevation, partly in section, of the treble-end portion of a portable *tr* assembly of the invention in position of use on a host manual.

FIG. 19 is a side elevation detail of a *tr* key of FIG. 18 with ivory-carrying portions omitted so as to show the portion of the *tr* key bodies which is uniform in all of them; said FIG. 19 also showing motion-limiting rods (in section) constituting the means referred to in the preceding paragraph, as well as keys of a host manual and arrows depicting the movement of the parts during installation;

FIG. 20 is the same as FIG. 19 except that installation of said parts has been completed and the *tr* key then depressed, thereby depressing an underlying host black key;

FIG. 21 is a schematic side elevation detail of a downpusher portion of a *tr* key of FIG. 18 resting on a levelizer; plus a similar but more rearward downpusher portion exaggeratedly elevated above said levelizer;

FIG. 22 is the same as FIG. 21 except that contact with the levelizer is being made by said more rearward downpusher portion, due to down pressure having been exerted by a player's finger at the locus of the arrow in FIG. 22 rather than at the locus of the arrow in FIG. 21;

FIG. 23 is a side elevation detail of a snap-on variation of the lower front portion of a *tr* key of FIG. 18;

FIG. 24 is similar to FIG. 23 except that it is of a snap-on variation of the upper rear portion of said key;

FIG. 25 is a front elevation diagram of a succession of three of the *tr* keys of FIG. 18 together with the lower front motion-limiting rod referred to in the above description of FIG. 19;

FIG. 26 is a perspective detail of the bass-end portion of the *tr* keys-carrying frame appearing in FIG. 18, the keys being omitted however, and the upper one of the *tr* frame structures referred to in the above description of FIG. 19 being shown in process of being assembled into said end portion via feeding through eyes in $$\frac{oct}{12}$$

spacers comprised therein;

FIG. 27 is a perspective detail similar to FIG. 26 but showing a larger portion of the frame thereof, together with frontwardly located $$\frac{oct}{12}$$

spacers and a portion of the non-shiftable frame appearing in that figure; said last-mentioned frame including frontwardly extending structure optionally usable to form a fixed floor to immediately underly or impart support to the front *tr* frame structure appearing in FIG. 18;

FIG. 28 is generally similar to FIGS. 26 and 27 except that still further portions of the *tr* keys-carrying frame of FIG. 18 are broken away, while additional parts (to be discussed below) are shown;

FIG. 29 is a side elevation of an alternative form of the structure appearing in the rear portion of FIG. 18;

FIG. 30 is a side elevation detail of an alternative form of a portion of the structure appearing in FIG. 29;

FIG. 31 is a side elevation detail of an optional form of the bass-end frame member of the non-shiftable frame appearing in FIGS. 27–28, the same being in process of being installed on the bass-end block of a host instrument;

FIG. 32 is the same as FIG. 31, except that installation has been completed, thereby locking said bass-end frame member into position via engagement with horizontal pins extending horizontally from the host bass-end cheek (understood).

Referring to the drawing in detail:

In FIGS. 1–11 anchor pivot rod 1 is fixed in bass-end frame member 2 (FIG. 10) of non-shiftable frame 3, and in a corresponding frame end member (understood) at the opposite end of said frame 3. Slidably sleeved on said rod 1 is pivot tube 4, and united to the latter is treble-end frame member 5 of shiftable frame 6, as well as a corresponding base-end frame member (understood) at the opposite end of said frame 6. Rigidly interconnecting said end members of frame 6 is lifter bar 7, it and said tube 4 constituting the longitudinal members of said frame 6. Said bar 7 extends through apertures 8 in each of the *tr* black keys 9 and *tr* white keys 10 of the *tr* manual of the assembly, said *tr* keys being rotatively mounted on said pivot tubes 4 via encircling of the same by eyes 11 in the rears of said keys. Levelizers 12 resting on each of the white ivories 13 of the host manual (unnumbered) are swingably pivoted on pins 14 carried by partitions 15 affixed to anchor strip 16 of frame 3, and are maintained in alinement by guide structures 17 integral with partitions 15 as depicted in FIGS. 11 and 1. In the case of levelizers such as 18 (FIG. 12) which rest on host single white ivories such as 19, i.e., flanked by host black keys 20, said black keys may be utilized as the alinement means, the pivoting in such case being on hooks 21 extending from anchor strip 16 and passing through eyes 22 in the rears of the levelizers. In fact, the guide structures 17 of FIG. 11 may optionally be dispensed with and their function served by adjacent host black keys; but this would not be preferred in situations where a difference between the octave length of the particular host instrument and that of the manual might, as explained in '942, call for especially narrow levelizers.

As shown in FIG. 1, frame 3 rests on top surfaces of the host black keys and the levelizers. In consequence, the entire *tr* assembly receives its support from the collective holdup force of host keys. Frontward or rearward displacement of the *tr* assembly is prevented by juxtapositioning of anchor strip 16 between the rear faces of host black keys 20 and host stop rail 23, while endward displacement is prevented by juxtapositioning of said partitions between successive host black keys and interlocking of shiftable frame end members 5 via tiny bristles 24 engaging fine-mesh wire screen or hardware cloth 25 fixed on endward surfaces of frame 3.

Figure 3:
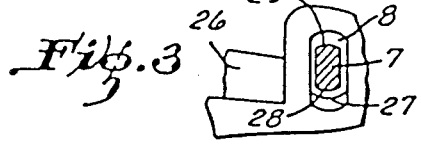
FIG. 3 is a side elevation detail of a rear portion of the assembly of FIG. 1, showing a keys-lifter bar but omitting frame ends.
Figure 4:
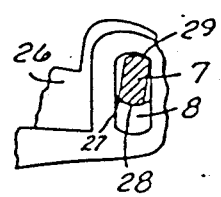
FIG. 4 is the same as FIG. 3 except that the keys-lifter bar has been raised by lifting of a lifter key.
Figure 5:
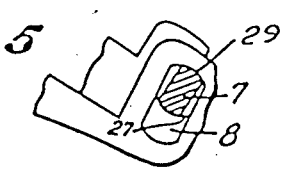
FIG. 5 is the same as FIG. 4 except that further lifting has caused said lifter bar to lift the other *tr* keys.

After installation of the *tr* assembly, adjustment to a desired transpositional position is accomplished merely by raising a lifter key 26, which advantageously may be the e-flat *tr* key nearest the center of the assembly, thereby causing the bottom 27 of the aperture 8 of said key to engage the bottom 28 of lifter bar 7 and raise it from its FIG. 3 position to its FIG. 4 position, whereupon further lifting causes the upper surface 29 of bar 7 to engage the tops of the apertures 8 in the rest of the *tr* keys and lift them too, then sliding the whole assembly along pivot rod 1 by fiinger pressure exerted against a side surface of the lifter key untitl the *tr* arrow (FIG. 7) coincides with the desired increment of transposition appearing on the *tr* scale (FIG. 7)—the latter being located e.g. on the top front surface 30 of the upper longitudinal number 31 of non-shiftable frame 3—whereupon lowering of the lifter key not only causes the rest of the *tr* keys to descend into position of use but also causes the shiftable frame end members to seat on said cloth 25 and thereby accomplish locking via interengagement of said bristles and cloth as above described.

Although the rears of the *tr* keys are of equal width and so dimensioned as to be fully operative without use of spacers between them, it may be desired—e.g. if said rears consist of material which is subject to swelling or shrinking in a particular climate—to employ one of more spacers between them or certain of them, in fixed positions along said tube. A suitable form of such spacer is shown in FIGS. 8–9.

Figure 8:
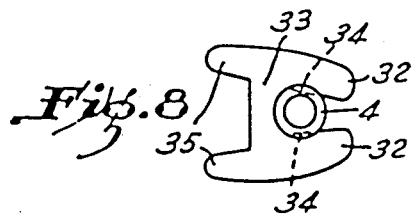
FIG. 8 is a side elevation detail of a form of snap-on spacer for optional placement in transverse grooves of the pivot tube appearing in FIGS. 1 and 6, to insure against sidewise displacement of the *tr* keys, the latter being swingably carried on said tube.

Referring to FIG. 8, rearwardly extending arms 32 of spacer 33 may be squeeze-fed onto tube 4 so as to rest in transverse grooves 34 in the upper and lower surfaces thereof and seat on frame 3. Frontwardly extending arms 35 correspond in outline to the frontward portion of frame member 5, except for the recess between them through which bar 7 extends. In connection with said rearwardly extending arms 32 and squeeze-feeding of them into place, it may be remarked that the rears of *tr* keys 9 and 10 can be slit, if desired, to permit similar feeding of apertures 8 of said keys onto said tube 4.

Figure 6:
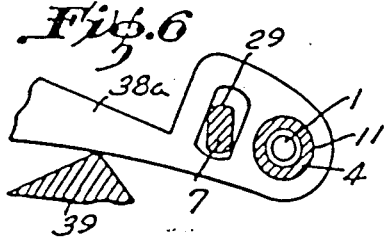
FIG. 6 is a side elevation detail of the rear portion of a temporarily inactive (hereinafter designated "idle") *tr* white key resting in a position of non-use on host end block-supported structure, following lowering of the active *tr* keys into their position of use.
Figure 7:
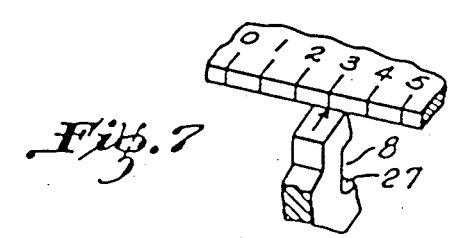
FIG. 7 is a perspective detail of a *tr* scale which may be located on upper rear *tr* frame structure, and a *tr* arrow located on subjacent top surface of said lifter key.

Referring to FIGS. 9–10, it is believed that the various parts depicted therein will already have been understood from the foregoing description of said figures, but it may be added that endward extension 36 of nonshiftable frame 3 clearingly overlies host end block 37, thus permitting frontward portions of idle keys to rest either on said end block, as in the case of black *tr* key 38, or, as in the case of white *tr* key 38–a, on host end block-supported structure such as 39 (FIGS. 10 and 6). The latter structure might e.g. be a registration control tablet, but in any case will probably be of considerably less vertical dimension than said 39. In FIG. 9, the broken away structures 40 depict the portions of the *tr* keys immediately overlying and immediately underlying their eyes 11, the latter being shown in FIGS. 1 and 6.

In FIGS. 15–17 eyes 41 of levelizers 42 correspond to eye 22 of levelizer 18 of FIG. 12, and hooks 43 to hook 21 of said figure. Hook 43, however, depends from non-shiftable frame 3 instead of extending frontwardly from anchor strip 16. Inverted guide pins 44, extending downwardly from frame 3 to pass through apertures 45 in the levelizers, serve as alinement-preservers for them. Heads 46 of the guide pins 44 serve to sustain the levelizers during installation of the assembly, as depicted in FIG. 16.

Referring again to FIGS. 1–2, downstop bar 47 is sustained by host endblocks, only the base end one 48 being shown. Frontward upward surface 49 of said bar 47 is located a customary key-drop distance (about ⅜″) below surfaces 50 of the front portions of *tr* white keys 10, to thereby limit their down movement to that distance. And rearward upward surface 51 of said bar 47 is disposed to similarly limit down movement of surfaces 52 of *tr* black keys 9. While this might disqualify the assembly for use where the host is a piano (unless as a silent practice keyboard), the assembly nevertheless is fully operative on conventional organs, in which the sounders are actuated by electrical contacts made after only a fraction of the down movement of the keys. In other words, the exaggerated drop at the front of the ivories in the case of the assemblies shown in FIGS. 1, 3 and 12 is alleviated by the presence of said bar 47.

In the FIG. 17 drawing both of the shiftable frame end members are omitted. Otherwise, the *tr* assembly of that figure is so similar to that of FIG. 1 that the same numerals have been used to designate a number of the parts therein which manifestly are nearly identical with their analogs in FIGS. 1–11. The scheme of the assembly of FIG. 17 however, is to insure its operability either on organs or pianos, downstop bar 47a in the latter case being omissible, as well (with such bar present) as for silent keyboard practice on a piano. Spacer beads 53 and 54, on side walls of the *tr* keys of FIG. 17, respectively correspond to spacer beads 346 and 347 of FIG. 60 of '364. Of course, spacers such as 18 and 52 of FIGS. 3 and 12 of '942 could be incorporated into the assemblies of present FIGS. 1 and 17, or structure such as bar 160 carrying spacer fingers 166 of FIG. 34 of '942 could be disposed to pass through and rest on the bottoms of windows such as 162 of the last-mentioned figure, provided such windows were introduced into the portions of the *tr* keys of FIG. 17 superjacent to the tops of the host black ivories and levelizers on which said *tr* keys rest.

It will have been noted that due to the presence of endward extensions 36 of frame 3, rod 1 and tube 4 were correspondingly elevated above them in both FIGS. 1 and 17, and that still further elevation of said parts would be feasible if desired; also that the increased vertical dimensions of the rears of the keys (necessitated by the presence of apertures 8) can aid in stabilization of the *tr* keys during use.

In the assembly of FIGS. 18–28 non-shiftable frame 55, from which hooks 56 depend to provide pivots for levelizers 57, rests on and is supported by host bass-end block 58 and a corresponding treble-end block (not shown). Said frame 55 is secured against frontward or rearward displacement by any convenient means (e.g. such as depicted in FIGS. 23–28, or 31–32 to be discussed below), and against endward displacement by the host end cheeks (understood). Upright anchor walls 59 and 60 of said frame serve to confine anchor pins 61 between them, said pins being integral parts of shiftable frame 62 and consequently serving to hold it against frontward or rearward displacement during use. Bass-end frame member 63 of frame 62 unites rearward portions of said frame to frontward $$\frac{oct}{12}$$

guide sleeves-carrying portion 64, said portion 64 optionally bearing against host front rail 65 via cushion strip 66. T*r* black keys 67 and *tr* white keys 68 are carried by said shiftable frame 62 via rear motion-limiting rod 69 passing through apertures 70 in said keys, and front motion-limiting rod 71 passing through apertures 72 therein. Said *tr* keys 67 and 68 are self-positioning during installation of the assembly into position of use, as depicted in FIG. 19; i.e., while the shiftable frame 62 which carries them is being moved rearwardly and then downwardly, the keys (only their body portions 73 being shown in said figure) hang from said rods 69 and 71 until pins 61 have been fed into the space 74 between anchor walls 59 and 60, whereupon the down-pusher portions 75 or 76 come to rest on host black ivories 77 or frontward portions 78 of levelizers 57, respectively. Due to the frontward weight of the *tr* keys, they would tend to move frontwardly except that the rear walls of their apertures 70 are blocked by rod 69 as at 79. And by the same token, rearward displacement of the *tr* keys is precluded by their tendency to press rearwardly against rod 71 as at 80. Endward displacement of the *tr* keys as a unit is prevented by the shiftable frame's end members, and $$\frac{oct}{12}$$

spacing of the successive keys is insured by spacer partitions 81 in the rear portion of frame 62 and spacer partitions 82 in the front portion 64 thereof.

Referring to FIG. 20, it will be noted that exertion of finger pressure at any point frontwardly of *tr* key tail 83 will carry the underlying host black key down, the *tr* key body 73 moving slightly forward (while nevertheless undergoing straight-line motion) due to the slant of apertures 70 and 72. Said forward movement advantageously may be about $\frac{1}{32}''$ for a $\frac{3}{8}''$ drop, since the downpusher-contacted point on a host ivory characteristically moves frontwardly about that distance during its down movement, due to arcing.

Referring to FIGS. 21–22, where a player's finger pressure is exerted forwardly of downpusher portion 76 (as is usually the case), that portion is the one which will contact an underlying levelizer, and downpusher portion 75 will not come into play, since it is at a relatively slightly higher elevation than 76. But if the finger pressure, as in FIG. 22, is exerted rearwardly of portion 76, it will be portion 75 which will push down an underlying levelizer. In this connection, it may be observed that if the only downpusher portion were 76, pressure at the locus of the arrow in FIG. 22 would tend to cause a rearward rocking of the key, which—though it would at once be stopped by impingement of rear wall 84 of aperture 72 against rod 71—might not be desired. But exertion of finger pressure rearwardly of downpusher 76 is relatively rare (as already indicated), and even when it does occur the elevation of 75 can be so slightly above that of 76 as to make the difference imperceptible and inconsequential.

The reason for (optionally) wanting the *tr* keys overlying levelizers to exert their down pressure farther frontwardly as by 76, rather than more rearwardly as by 75, is of course that the drop of white piano keys lessens in proportion to the distance to their fulcrums, with the result that correspondingly greater finger force is required to depress them; wherefore, it may be thought preferable to have an underlying levelizer pushed down by 76 rather than 75, in the case of a white *tr* key being pressed down by a player's thumb at its front.

Referring to FIGS. 23–24, walls 73 and 74 of apertures 72 and 70 respectively, are cut away at the loci of the arrows. This, of course, is to permit the same sort of snap-on positioning about rods 71 and 69, respectively, as occurs in the case of the spacer 33 of FIG. 8. Manifestly, removal of the *tr* keys is readily effected by reverse manipulation, the same as in the case of said spacer.

Referring to FIG. 26, the end rod 69, after being fed through each of the apertures 70, will be lodged in recess 85 in frame member 63 and thereby secured against movement during use.

Referring to FIGS. 27–28, non-shiftable frame 55 comprises frontwardly extending bass-end arm 86 united to a corresponding treble-end arm (not shown) by elongate floor 87, the same immediately underlying portion 64 of shiftable frame 62. Said floor 87, though not essential to the practice of the assembly of FIGS. 18–28 provides supplemental sturdiness, both in fact and appearance. Up-turned portion 88 of frame 55 (a corresponding up-turned portion being contemplated for the other end) is in juxtaposition with bass-end cheek 89 and is secured in place by any suitable means, e.g. pins (not shown) passing through holes 90 to penetrate said cheek.

When shiftable frame 62 and parts carried thereby are lowered into position so that anchor pins 61 enter space 64 between anchor walls 59 and 60, *tr* arrow 91 is lined up to coincide with the particular mark on *tr* scale 92 corresponding to the number of semitones of transposition required. Then, on permitting the end frame member 63 and its analog at the treble end (not shown) to seat on nonshiftable frame 55, the member 63 or its said analog as well, will, due to having a suitably roughened or bristles-comprising under-surface (understood) lock said frame 62 in position for use, via engagement with surfacing 93 of hardware cloth or the like on an endward portion of the upper surface of frame 55, as best seen in FIG. 27.

Referring to FIG. 29, non-shiftable frame 55 and subjacent parts are the same as in FIG. 18, but in place of anchor walls 59, 60 anchor rod 94, secured in and supported by up-turned bass-end portion 95 and a corresponding treble-end portion (not shown), is provided; and in place of anchor pins 61, a tube 96 is supplied to anchor shiftable frame 97 against front-rear displacement, via being sleeved on rod 94; said tube 96 being secured in bass-end member 98 of frame 97 and a corresponding treble-end member (not shown). Shifting of frame 97 into a selected transpositional position is effected by sliding tube 96 along rod 94, advantageously after having first used one of the *tr* black keys 99 to lift rod 100 (corresponding to rod 69 in FIGS. 18–20, 24 and 26–27) and via it, the rest of the *tr* keys; this operation being accompanied by rotative movement of tube 96 about rod 94 as schematically depicted by the upward arcing arrow in FIG. 29 (the lowering of the parts into position of use being accompanied by reverse movement as depicted by the other arrow in said figure).

The parts shown in FIG. 30 are the same as in FIG. 29 except that inverted, open-mouthed channel member 101 takes the place of tube 96, to permit ready installation of the shiftable assembly onto rod 94 and ready removability of said assembly therefrom.

Referring to FIGS. 31–32, bass-end frame member 102 is contoured to provide recessed portions 103 and 104, the same being so dimensioned that when the member 102 is rested on host end block 105 as in FIG. 31 and then slid rearwardly into the postion shown in FIG. 32, the vertical walls 106 and 107 of said recesses respectively engage pins 108 and 109 protruding from bass-end cheek (understood) in the same manner as the pins mentioned in connection with holes 90 in the foregoing description of FIGS. 27–28. A treble-end member corresponding to bass-end frame member 102 is of course contemplated, the two being interunited by longitudinal frame member 110 of a non-shiftable frame such as 55 in FIGS. 26–27.

With reference to the expression "idle" *tr* key, used in describing *tr* keys 38 and 38–*a* of FIGS. 10 and 6, it may be observed that any *tr* key which, during use of the *tr* assembly comprising it, is not supported by either a levelizer or a host black ivory, but merely rests directly on a host white ivory, will qualify as an idle *tr* key. Thus, a *tr* assembly comprising, say 49 *tr* keys in chromatic series and only 22 levelizers (disposed to respectively rest on 22 successive host white ivories) might be centered midway along an ordinary 88-note manual, so that during use there would always be some idle *tr* keys at each end of the assembly, even though such idle keys would neither be resting on host end block structures, levelizers nor host black ivories, but only on host white ivories.

In the preferred practice of the invention, the portable *tr* assembly will always comprise such a plurality of *tr* keys in chromatic series that at least one of the two terminal *tr* keys of said plurality, in at least one transpositional adjustment of the assembly, will qualify as an idle *tr* key.

In case an upstop rail for the *tr* keys is desired, mere placement of a bar along rearward portions of them (arched to fit over *tr* black ivories, if not located rearwardly thereof) may suffice, though in such case weight distribution in accordance with the description of FIG. 32 of '942 will preferredly be effected.

Figure 2:
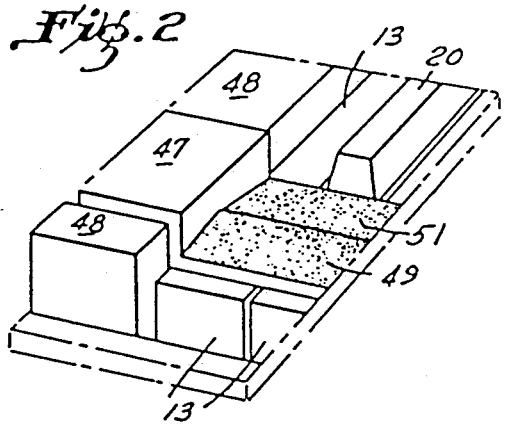
FIG. 2 is a perspective of the bass-end portion of the down-stop bar appearing in FIG. 1, said portion being supported by the bass-end block of a host keyboard.

Optionally, downstop bars such as 47 in FIGS. 1–2 and 47–*a* in FIG. 17 may be supported by strut fins in accordance with the description of FIG. 9 of '956 rather than host end blocks, and the vertical front surfaces of the fins (if the latter be integrated to the downstop bar) may be juxtaposed against the inner rear face of the host front rail to thereby insure against frontward displacement of the bar during use.

If desired, the assemblies of FIGS. 18–32 may be floor-based so as to be movable to and from position of use without need for being lifted.

With reference to the novelty in assemblies according to FIGS. 18–28 and as claimed hereinafter, it may be observed that in them the *tr* key's ivory constitutes an upwardly facing surface for being contacted by a player's finger during use, the underlying host key constitutes resilient means disposed to yieldingly support said *tr* key via intercontact therewith at a first locus, body portion 73 and key tail 83 of the *tr* key constitute equalizer structures rigidly integral with the *tr* key, and a plurality of motionless-in-use guide structures provide rub points or guide surfaces 79, 80 which are slidingly contacted by said equalizer sructures during use, whereby downward movement of said *tr* key is held to a straight-line course. To prescribe geometric ratios and ranges particularly advantageous in the practice of said common novelty, it may be observed that each such assembly comprises at least one rub point or surface such as aforesaid which lies in a first horizontal plane and a first vertical line, at least one other such rub point which lies in a second horizontal plane and a second vertical line, and at least one locus of intercontact such as aforesaid which locus lies in a third horizontal plane and a third vertical line, and that said first horizontal plane advantageously will be at least 5, 6, 7, or more times as distant from said third horizontal plane as is second horizontal plane; while said first vertical line advantageously will be at least 2, 3, or even more times as distant from said third vertical line as is said second vertical line.

Desirable properties for all materials to be used in the assemblies of the invention are: constancy of shape and dimension despite atmospheric differences, corrosion resistance, durability, and low cost. Low density, is not, generally speaking, a critical requirement for materials to be used for parts which do not move during use. For parts which do move during use, however, desirable properties additional to those above designated include: high strength-to-weight ratio, high resistance to deformation, and anti-friction. Disclosures of particular materials possessing properties such as aforesaid will be found in '942 and '364.

It will be apparent that many changes in the physical embodiments of the invention and its novel aspects may be made within the scope of the appended claims without departing from the spirit of the invention.

What is claimed is:

1. A portable transposer assembly for use in association with a host musical instrument which is of the keyboard type and has a stop rail or similar riser at the rear of its ivories, which assembly comprises
    (a) a first frame which is stationary in use, holds a plurality of levelizers, and is associated with a second frame which holds an assembly of *tr* keys and is shiftable as a unit therealong,
    (b) an anchor strip in union with and depending about 7⁄16 inch downwardly from the rear of said first frame, for placement between the rear ends of the ivory-topped portions of host black keys and such stop rail, whereby to anchor said first frame against frontward displacement during use,
    (c) said first frame comprising anchor means disposed for positive engagement with said second frame, to thereby anchor said second frame to said first frame and against frontward displacement relative thereto; said anchor strip consequently serving to anchor both said frames as a unit, against frontward displacement during use.

2. The assembly of claim 1 wherein
(d) said assembly includes a rearwardly disposed longitudinal member which comprises a heavy metal, thereby enhancing the inertia and stability of rearward portions of said assembly.

3. A portable transposer assembly for use in association with a host musical instrument of the keyboard type, which assembly comprises
 (a) a first frame which is motionless-in-use and carries a plurality of levelizers, and
 (b) a second frame which carries a series of at least 25 *tr* keys in association with said levelizers,
 (c) a *tr* keys-lifter bar disposed for lifting said series and carrying it as a unit to any of a plurality of chromatically successive transpositional adjustments along said first frame,
 (d) the number of *tr* keys in said series being such that at least one of the two terminal *tr* keys will be an idle key irrespective of which of said plurality of transpositional adjustments of said series along said first frame is selected.

4. A transposing device for a keyboard-type musical instrument, said device comprising
 (a) a frame having a rearwardly located longitudinal member which is stationary in use,
 (b) a plurality of lever members underlying said longitudinal member, each of which plurality contains a downwardly extending aperture,
 (c) a plurality of guide pins depending from said longitudinal member, each of said pins respectively extending into one of said apertures,
 (d) said apertures being respectively disposed for descending along said pins during use, said pins thereby serving to guide said lever members during said descending.

5. The device of claim 4 wherein
 (e) said lever members are levelizers.

6. The device of claim 5 wherein
 (f) lower portions of said pins have heads of greater horizontal dimension than said apertures, thereby constituting supports for said levelizers during transportation of said device.

7. In a transposing device for a keyboard-type musical instrument
 (a) white and black *tr* keys having upwardly extending tail portions,
 (b) a frame member carrying spacers having upwardly extending guide portions in respective operative juxtaposition to said tail portions,
 (c) said tail portions being slidably disposed alongside said spacers at loci at least one of which is at an altitude higher than that of front top portions of the ivories of said black *tr* keys, said altitude being measured with said black *tr* keys in horizontal disposition,
 (d) stabilization of said *tr* keys during use being thereby aided.

8. A transposing device for a keyboard type musical instrument comprising
 (a) a first frame and a plurality of elongate keys-levelizing members associated therewith, extending frontwardly therefrom in approximately horizontal disposition, and having frontward upper surfaces disposed at a common elevation,
 (b) means for holding said keys-levelizing members adjacent to said first frame in mutually parallel co-alinement and against sideward displacement,
 (c) a second frame and a chromatic series of piano type *tr* keys associated therewith, said keys having downpusher portions for contacting said surfaces to depress said members during use, said second frame having a longitudinal member disposed higher than the horizontal plane which includes said elevation, said second frame comprising a bass-end arm and a treble-end arm, and said second frame and said series being transpositionally shiftable as a unit along said first frame,
 (d) an elongate down-stop member having an upper surface disposed to limit down movement of the frontward portions of the white keys of said series, whereby uniformity of the extent of such down movement is insured, in any of a plurality of chromatically successive transpositional adjustments of said series along said first frame,
 (e) said down-stop member being disposed frontwardly of the fronts of said keys-levelizing members, below frontward portions of said white keys, and extending bass-endwardly beyond said bass-end arm and treble-endwardly beyond said treble-end arm during any of said plurality of adjustments,
 (f) terminal portions of said down-stop member consequently being available for receiving support from host structures located endwardly beyond each said end arm, irrespective of the particular said adjustment selected.

9. The transposing device of claim 8 wherein
 (g) said down-stop member is motionless during transpositional shifting of said second frame along said first frame.

10. The transposing device of claim 8 wherein
 (h) the under surfaces of the wide parts of the white keys of said series extending frontwardly of the ivories of the black keys thereof comprise downwardly angled portions, and
 (i) said down-stop member is disposed rearwardly of the fronts of said downwardly angled portions.

11. The device of claim 10 wherein
 (j) at least a portion of said upper surface of said down-stop member slopes downwardly toward its front.

12. The device of claim 10 wherein
 (k) said key-levizing members are levelizers and down-stop member slopes downwardly toward its rear.

13. The transposing device of claim 8 wherein
 (j) said keys-levelizing members are levelizers and said upper surface is disposed to limit said down movement to a distance within the range of 5/8 inch to 3/8 inch.

14. The transposing device of claim 10 wherein
 (k) said keys-elevlizing members are levelizers and said upper surface is disposed to limit said down movement to not over 5/8 inch.

15. The transposing device of claim 13 wherein
 (l) said down-stop member underlies frontward under surfaces of the black keys of said series as well as of the white keys thereof.

16. In a *tr* assembly
 (a) a first sub-assembly which is non-shiftable during transpositional adjustment of said assembly, comprises a first frame and a plurality of elongate keys-levelizing members associated therewith and extending frontwardly therefrom in approximately horizontal disposition,
 (b) said first sub-assembly also comprising a bass-end block, a treble-end block, and a frontwardly located down-stop rail,
 (c) a second sub-assembly which is shiftable along said first frame during transpositional adjustment of said assembly and comprises a chromatic series of piano type keys carried by a second frame,
 (d) said second frame comprising portions at each end which are respectively disposed to overlie portions of said end blocks during any of a plurality of chromatically successive transpositional adjustments of said assembly,
(e) said down-stop rail underlying, and serving to limit the down movement of, the wide front parts of the white *tr* keys of said series.

17. The *tr* assembly of claim 16 wherein (f) $\frac{oct}{12}$ lock means are disposed on at least one of said end blocks, and
(g) locking means complementary to said lock means are disposed on said second frame,
(h) whereby, on lowering of said second frame into a selected transpositional position, said lock means and said locking means become interengaged, and on lifting of said second frame out of said position, they become disengaged.

18. A *tr* assembly comprising a chromatic series of piano type *tr* keys and a plurality of levelizers operatively associated therewith, wherein
(a) a side wall of a white key of said series carries a spacer bead at a frontward locus, and
(b) said locus is farther frontward than the front of the one of said plurality which is next to said wall,
(c) whereby possibility of impingement of said bead on said one, during down movement of said wall, is avoided.

19. A levelizers assembly adapted for use as the non-shiftable portion of a portable transposing device, said assembly comprising
(a) a plurality of elongate, approximately horizontally disposed, frontwardly extending levelizers,
(b) a frame disposed along rearward portions of said levelizers and carrying guide members for holding said levelizers in operative position during use,
(c) each said levelizer having an aperture extending from a top surface thereof to a bottom surface thereof, and
(d) upright portions of said guide members being respectively disposed in said apertures during reciprocation of said levelizers in use.

20. The assembly of claim 19 wherein said guide members extend frontwardly from a portion of said frame.

21. The assembly of claim 19 wherein said guide members extend downwardly from a portion of said frame.

22. In a *tr* assembly comprising a chromatic series of piano type *tr* keys and a plurality of levelizers operatively associated therewith,
(a) a frame which is motionless during transpositional adjustment of said assembly and comprises means for holding said levelizers in parallel co-alinement and against frontward displacement during use,
(b) said means comprising a frontwardly extending partition disposed to overlie a host white key-to-white key seam, each side wall of which partition is flanked by one of said plurality,
(c) said each one of said plurality being free-swingingly pivoted on a pin extending transversely from a rearward portion of said partition.

23. In a *tr* assembly comprising a chromatic series of piano type keys and a plurality of levelizers operatively associated therewith,
(a) a frame which is motionless during transpositional adjustment of said assembly and comprises means for holding said levelizers in parallel co-alinement and against frontward displacement during use,
(b) said frame resting on and receiving support from said levelizers, and the latter being disposed to rest on and be supported by host white keys,
(c) the collective hold-up force of said host white keys consequently being transmitted by said levelizers to said frame.

24. In a *tr* assembly
(a) a chromatic series of piano type *tr* keys having portions presenting upwardly extending transverse surfaces which surfaces are disposed for descending during down movement of the fronts of said keys in use, and
(b) an elongate motionless-in-use member disposed for being slidably engaged by said surfaces during their said descending in use, to thereby prevent axial displacement of said keys.

25. The *tr* assembly of claim 24 wherein
(c) said surfaces face frontwardly and slant rearwardly, thereby permitting frontward movement of said keys incident to the component of frontward arcing characteristic of usual piano type keys.

26. The *tr* assembly of claim 25 which comprises
(d) a plurality of levelizers in operative association with said *tr* keys, and wherein,
(e) said surfaces are located more rearwardly than the rears of ivories of said keys.

27. The *tr* assembly of claim 26 which comprises
(f) anchor means for holding said assembly against frontward displacement during use.

28. In a *tr* assembly comprising a chromatic series of piano type *tr* keys and a plurality of elongate frontwardly extending keys-levelizing members associated therewith, said members normally being in approximately horizontal disposition,
(a) a first frame which is motionless during transpositional adjustment of said assembly and holds said plurality,
(b) a second frame which holds said series and is transpositionally shiftable along said first frame,
(c) said second frame comprising a longitudinal member carrying vertically disposed $\frac{oct}{12}$ guide members for guiding rearward portions of *tr* keys of said series during their reciprocation in use,
(d) said rearward portions and said guide members extending to a first elevation which is higher than that of the rear boundaries of black ivories of said *tr* keys.

29. The *tr* assembly of claim 28 wherein
(e) at least a portion of said longitudinal member is disposed at a second elevation which is higher than said first elevation, and
(f) said guide members depend from said longitudinal member to a third elevation which is lower than said first elevation.

30. In a *tr* assembly,
(a) a transpositionally shiftable frame carrying a chromatic series of piano type *tr* keys each key of which series comprises a transverse aperture,
(b) said frame comprising a treble-end arm, a bass-end arm, and a *tr* keys-lifter bar, said arms and said bar being integral with said frame,
(c) said bar extending through said apertures and being disposed, on being raised, to liftingly engage the ceilings of said apertures,
(d) said ceilings being disposed at a sufficiently high elevation to permit downward movement of said keys during use, and
(e) said apertures being of sufficient size to permit frontward movement of said keys incident to the component of frontward arcing characteristic of piano type keys.

31. The *tr* assembly of claim 30 wherein
(f) the bottoms of said apertures are disposed at a sufficiently low elevation to permit swinging of said keys upwardly beyond their normal position, to thereby facilitate supporting them on elevated host end block structures, when idle.

32. A keyboard assembly comprising:
(a) a piano type key, (b) resilient means disposed to yieldingly support said key via intercontact therewith at a first locus,
(c) a plurality of equalizer structures rigidly integral with said key and extending to the hereinafter mentioned rub points,
(d) a plurality of motionless-in-use guide structures providing rub points which are slidingly contacted by said equalizer structures during use, responsive to downward finger force applied to said key, and whereby downward movement thereof is held to a straight-line course during use,
(e) at least one said rub point lying in a first horizontal plane and a first vertical line, at least one other such rub point lying in a second horizontal plane and a second vertical line, and said first locus lying in a third horizontal plane and a third vertical line,
(f) said first horizontal plane being below said third horizontal plane and at least five times as distant therefrom as is said second horizontal plane, and
(g) said first vertical line being at least twice as distant from said third vertical line as is said second vertical line, and said first, second and third vertical lines being included in a vertical plane which intersects the front and rear boundaries of the ivory of said key.

33. The assembly of claim 32 wherein
(h) said first vertical line is frontward of said third vertical line.

References Cited by the Examiner

UNITED STATES PATENTS

| | | | |
|---|---|---|---|
| 1,107,783 | 8/14 | Goss | 84—446 |
| 2,729,439 | 1/56 | Ohaus | 177—246 |
| 2,996,942 | 8/61 | Jewett | 84—446 |
| 3,019,846 | 2/62 | Baur | 177—246 |

LEO SMILOW, *Primary Examiner.*